United States Patent
Gong

(10) Patent No.: US 8,855,063 B2
(45) Date of Patent: Oct. 7, 2014

(54) METHOD AND APPARATUS FOR RESPONSE SCHEDULING IN A DOWNLINK MULTIPLE-USER MULTIPLE INPUT MULTIPLE OUTPUT NETWORK

(75) Inventor: Michelle X. Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 12/800,558

(22) Filed: May 18, 2010

(65) Prior Publication Data

US 2011/0286402 A1 Nov. 24, 2011

(51) Int. Cl.
*H04W 72/04* (2009.01)
*H04W 72/12* (2009.01)
*H04L 1/16* (2006.01)

(52) U.S. Cl.
CPC ......... *H04W 72/1231* (2013.01); *H04L 1/1685* (2013.01)
USPC ........................................ 370/329

(58) Field of Classification Search
CPC ............... H04W 72/1236; H04W 72/1289; H04W 72/1221; H04W 72/1268; H04L 1/1685; H04L 1/1887; H04L 1/1896; H04L 2001/0093
USPC .................... 370/329, 328; 375/267
See application file for complete search history.

(56) References Cited

U.S. PATENT DOCUMENTS

| | | | |
|---|---|---|---|
| 2005/0226273 A1 | 10/2005 | Qian | |
| 2006/0092871 A1* | 5/2006 | Nishibayashi et al. | 370/328 |
| 2006/0285526 A1* | 12/2006 | Jang et al. | 370/338 |
| 2007/0058605 A1 | 3/2007 | Meylan et al. | |
| 2007/0133448 A1* | 6/2007 | Gao et al. | 370/311 |
| 2007/0147284 A1* | 6/2007 | Sammour et al. | 370/328 |
| 2007/0160020 A1 | 7/2007 | Osann | |
| 2009/0252110 A1* | 10/2009 | Sridhara et al. | 370/330 |
| 2009/0252143 A1 | 10/2009 | Sridhara et al. | |
| 2010/0040033 A1 | 2/2010 | Xhafa et al. | |
| 2010/0046457 A1 | 2/2010 | Abraham et al. | |
| 2010/0189056 A1* | 7/2010 | Nishibayashi et al. | 370/329 |

FOREIGN PATENT DOCUMENTS

| | | |
|---|---|---|
| CN | 102256368 A3 | 11/2011 |
| JP | 2006-129393 A | 5/2006 |
| JP | 2009-509469 A | 3/2009 |
| JP | 2009-518967 A | 5/2009 |
| JP | 2012-015996 A | 1/2012 |
| JP | 2012-500605 A | 1/2012 |
| JP | 2012-516662 A | 7/2012 |
| WO | 2007/038118 A2 | 4/2007 |
| WO | 2007/081614 A2 | 7/2007 |
| WO | 2010/022255 A1 | 2/2010 |
| WO | 2010/088535 A1 | 8/2010 |
| WO | 2011/146204 A2 | 11/2011 |
| WO | 2011/146204 A3 | 4/2012 |

OTHER PUBLICATIONS

International Search Report and Written Opinion received for the PCT Application No. PCT/US2011/033773, mailed on Jan. 24, 2012, 11 Pages.

(Continued)

*Primary Examiner* — Pao Sinkantarakorn
*Assistant Examiner* — Richard K Chang
(74) *Attorney, Agent, or Firm* — Forefront IP Lawgroup, PLLC

(57) ABSTRACT

Embodiment and methods and apparatus for scheduling one or more responses for multiple stations (STAs) in a downlink multiple-user multiple-input-multiple-output (MIMO) network transmission are provided.

19 Claims, 9 Drawing Sheets

(56) References Cited

OTHER PUBLICATIONS

International Preliminary Report on Patentability and Written Opinion received for PCT Patent Application No. PCT/US2011/033773, mailed on Nov. 29, 2012, 8 pages.

Office Action received for Japanese Patent Application No. 2011-110609, mailed on Jan. 8, 2013, 2 pages of English Translation and 2 pages of Japanese Office Action.

Office Action received for Chinese Patent Application No. 201110141419.5, mailed on May 24, 2013, 30 pages of English Translation and 17 pages of Chinese Office Action.

Office Action received for Japanese Patent Application No. 2011-110609, mailed on Oct. 15, 2013, 2 pages of English Translation and 2 pages of Japanese Office Action.

Office Action received for Korean Patent Application No. 2012-7030031, mailed on Dec. 19, 2013, 3 pages of English Translation Only.

Office action received for Chinese Patent Application No. 201110141419.5, mailed on Jan. 6, 2014, 33 pages of English Translation and 16 pages of Chinese Office Action.

Notice of Allowance received for Japanese Patent Application No. 2011-110609, mailed on Apr. 1, 2014, 1 page of English Translation only.

Notice of Allowance received for Korean Patent Application No. 10-2012-7030031, mailed on Apr. 28, 2014, 1 page of English Translation and 2 pages of Korean Notice of Allowance.

* cited by examiner

METHOD AND APPARATUS FOR RESPONSE SCHEDULING IN A DOWNLINK MULTIPLE-USER MULTIPLE INPUT MULTIPLE OUTPUT NETWORK

BACKGROUND

Wireless communication devices such as mobile telephones, personal digital assistants (PDAs), notebook and netbook computers, and the like continue to be popular among consumers, thereby driving the need for more reliable services, expanded areas of coverage, and increased functionality. A wireless communication device includes such terms as, for example, a mobile station, a subscriber station, an access terminal, a remote station, a user terminal, a terminal, a subscriber unit, user entity and user equipment, hereinafter referred to as stations (STAs).

A wireless communication system may provide communication for a number of cells, each of which may be serviced by a base station. A base station may be a fixed station that communicates with mobile stations. A base station may alternatively be referred to as an access point (AP).

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA).

One faster version of IEEE 802.11 is referred to as VHT (Very High Throughput). VHT allows for multiple transmissions to occur in parallel without causing a collision, like SDMA and OFDMA.

A multiple-input-multiple-output (MIMO) wireless network in an SDMA network is a communication system that generally includes an access point (AP) having multiple antennas communicatively coupled to multiple receiving stations. To support a downlink multi-user MIMO network, the access point (AP) may need to schedule multiple packets destined for the multiple stations for simultaneous transmission.

Specifically, the packets can be in accordance with Physical Layer Convergence Procedure (PLCP). The PLCP takes each 802.11 frame that a STA wishes to transmit and forms what the 802.11 standard refers to as a PLCP protocol data unit (PPDU). The resulting PPDU contains a PLCP preamble, PLCP header and PSDU.

If uplink (UL) SDMA is not supported, STAs may contend to transmit acknowledgements. However, the cost of collisions is very high and some STAs outside of an SDMA group may win the contention and start transmitting data frames. To avoid this situation, the AP needs to schedule acknowledgements from different STAs, meaning different STAs should only send back acknowledgements according to the AP's schedule. There is a plurality of techniques for scheduling the response frame. One method requires the use of a medium access control (MAC) duration field to schedule sequential responses. However, the Duration field in the MAC header is traditionally used to provide NAV (Network Allocation Vector) protection for providing transmission opportunity (TXOP) and/or reverse direction grant (RD) techniques. Thus, there is a need for methods and systems that improve MIMO transmissions with reduced collision risk.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

In accordance with common practice, the various described features are not drawn to scale but are drawn to emphasize specific features relevant to the present specification. Reference characters denote like elements throughout Figures and text.

DETAILED DESCRIPTION

Figure 1:
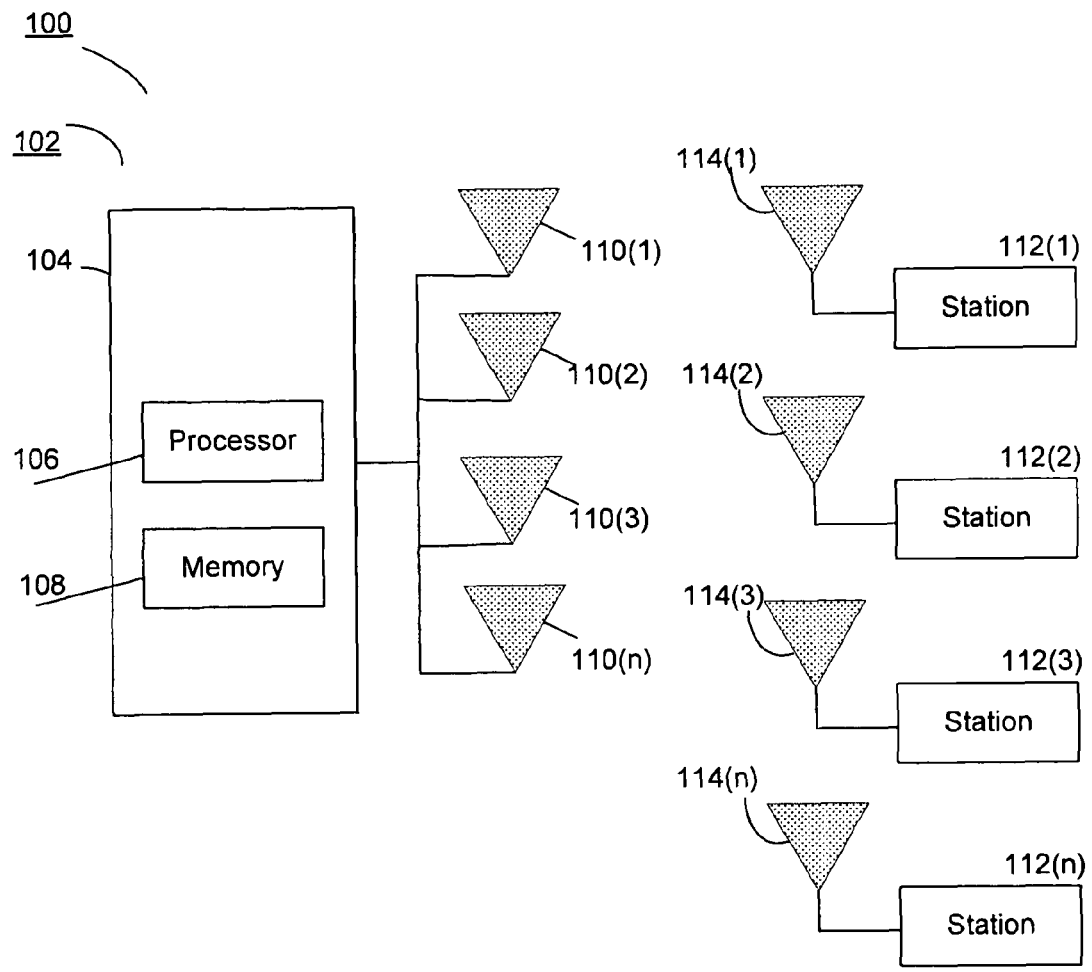
FIG. 1 is a block diagram of an embodiment of a wireless multi-user multiple-input-multiple-output network comprising an access point having multiple antennas and a plurality of stations.

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention and are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In the following discussion, an exemplary environment is described that is operable to employ an acknowledgement transmission technique to improve the performance of a downlink multi-user multiple-input-multiple-output (MIMO) network. Exemplary devices and procedures are then described that may be employed in the exemplary environment, as well as in other environments.

FIG. 1 illustrates an exemplary implementation of an environment 100 that is operable to employ a scheduling mechanism to improve the performance of a downlink multi-user multiple-input-multiple-output (MIMO) network. The environment 100 is depicted as having an access point (AP) 102 which includes a transceiver 104. The transceiver 104 includes in part a processor 106 and a memory 108. The access point 102 further includes a plurality of antennas 110 (1)-110(n) (where the integer n represents any number of antennas). As depicted, the access point 102 includes four antennas 110(1), 110(2), 110(3) and 110(n). In other embodiments, different numbers of antennas may be used.

The processor core 106 represents a processing unit of any type of architecture which has the primary logic, operation devices, controllers, memory systems, and so forth of the access point 102. For instance the processor core 106 may incorporate one or more processing devices and a chipset having functionality for memory control, input/output control, graphics processing, and so forth.

The processor core 106 may further be coupled via a memory bus (not shown) to a memory 108 which in an embodiment represents "main" memory of the access point (AP) 102 and which may be utilized to store and/or execute system code and data. Memory 108 may be implemented with dynamic random access memory (DRAM), static random access memory (SRAM), or any other type of memories including those that do not need to be refreshed.

Memory 108 may also include other storage devices. These other memory devices include removable media drives (for example, CD/DVD drives), card readers, flash memory and so forth. The memory 108 may be connected to the processor core 106 in a variety of ways such as via Integrated Drive Electronics (IDE), Advanced Technology Attachment (ATA), Serial ATA (SATA), Universal Serial Bus (USB), and so forth. The memory 108 stores a variety of application modules (not shown) which may be executed via the processing core 106 and memory 108 to provide a variety of functionality to the access point 102.

FIG. 1 further illustrates the environment 100 as including a plurality of stations (STA) 112. As depicted, the environment 100 includes four independent stations 112(1), 112(2), 112(3) and 112(n). Each station 112 includes an antenna 114. In an alternative embodiment, each station 112 may have a plurality of antennas 114. It is further contemplated that the environment 100 may include a single station (STA) 112 that includes a plurality of antennas 114 that matches the number of antennas 110 included with the access point.

Each antenna 110 of the access point 102 may transmit a unique signal to a specific station 112 antenna 114 or the access point can multiplex data packets intended for a specific station 112. Once a data packet is multiplexed into a plurality of signals, the access point 102 can transmit the plurality of signals.

The MAC layer ensures that data is collected efficiently and passes to the physical level to be sent to an intended recipient. As a condition to accessing the a medium, either wireless or other type of medium, the MAC Layer checks the value of its network allocation vector (NAV). The NAV maintains a prediction of future traffic on the medium based on duration information carried in MAC headers. The NAV should be zero before a STA can attempt to send a frame. Prior to transmitting a frame, a STA calculates the amount of time necessary to send the frame based on the frame's length and data rate. The STA places a value representing this time in the duration field in the header of the frame. When STAs receive the frame, they examine this duration field value and use it as the basis for setting their corresponding NAVs. This process reserves the medium for the sending STA.

Figure 2:
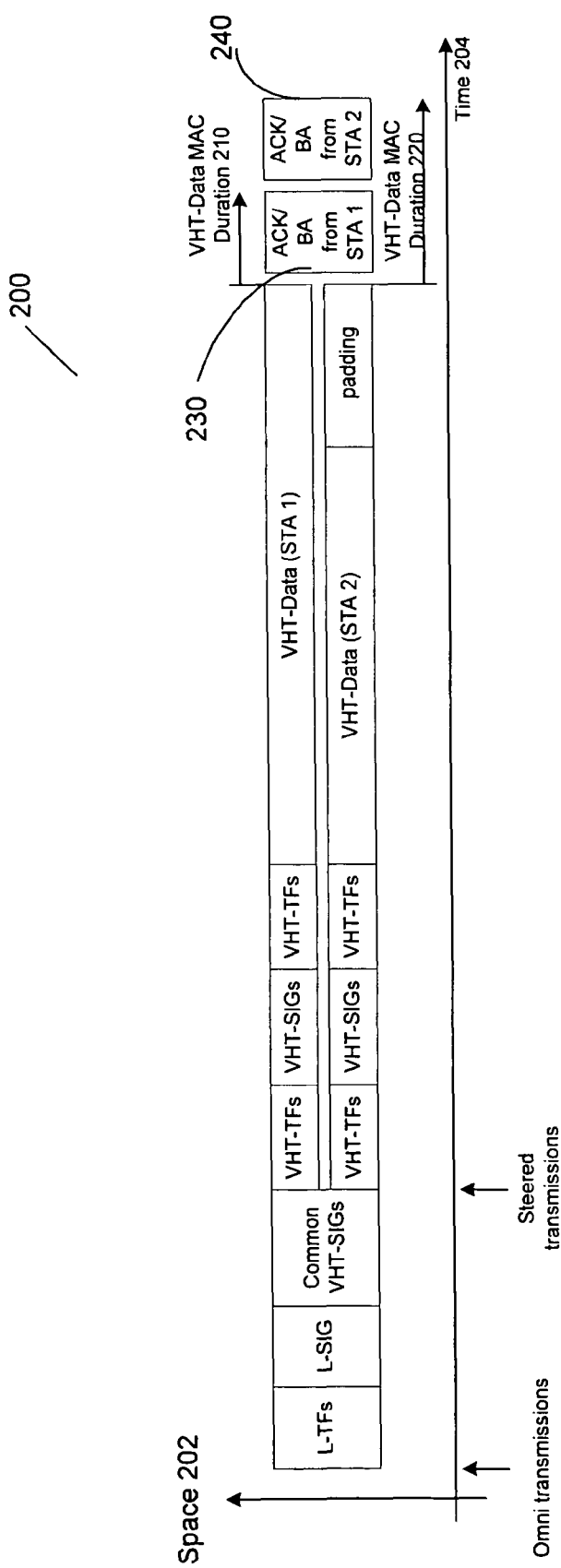
FIG. 2, is a representative MAC layer frame in a wireless multi-user multiple-input-multiple-output (MIMO) network.

FIG. 2 illustrates a representative SDMA frame 200 plot of space 202 versus time 204 illustrates how a Duration field, such as fields shown during VHT-Data MAC Duration 210 and 220 in the MAC header can be used to provide an acknowledgement (ACK) or a block acknowledgement (BA) shown as ACK/BA from STA 1 230 and ACK/BA from STA 2 240.

These same fields 230 and 240 are used to provide NAV (Network Allocation Vector) protection for providing fields for transmission opportunity (TXOP) and/or reverse direction grants (RD).

Figure 3:
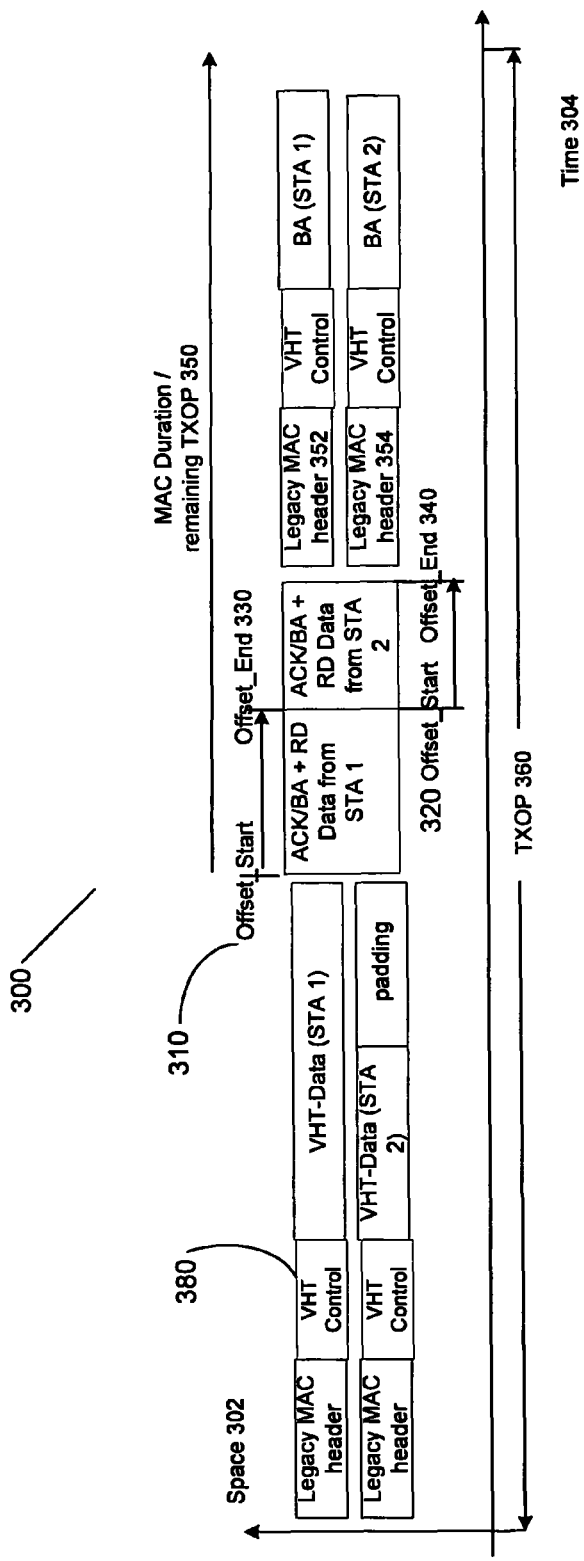
FIG. 3 is a representative MAC layer frame in a wireless multi-user multiple-input-multiple-output (MIMO) network in accordance with an embodiment.

Referring now to FIG. 3, a frame 300 in accordance with an embodiment is illustrated. Frame 300 shows an SDMA frame 300 plot of space 302 versus time 304 that illustrates an RD offset-start 310 and 320, and RD offset end points 330 and 340. FIG. 3 illustrates how the RD offset start and end fields are utilized. As shown, the field includes ACK/BA+RD Data from STA 1 beginning at start 310, and ACK/BA+RD Data from STA 2 beginning at start 320. The duration field MAC Duration/remaining TXOP 350 includes legacy MAC headers 352 and 354 for every frame transmitted in the TXOP and indicates the remaining TXOP of TXOP 360. The RD offset start fields 310 and 320 in the data frame indicate the start time of the RD transmission. The RD offset end fields 330 and 340 in the data frame indicate the end time of the RD transmission. The values in both fields correspond to the timing offset from the end of the data frame transmission. For instance, the first RD transmission from STA1 should begin a short inter-frame space (SIFS) period after receiving the data frame. Thus, the RD offset start field is set to the value of SIFS for STA1. The RD offset start field for STA2 is set to the value of SIFS combined with the offset end field for STA1.

The RD offset start field and a RD offset end field identify the response offset and the time granted to a responder. The two fields can be carried in the VHT-Control field 380. The fields are N bits in length and have units of microseconds. The RD offset start field indicates the offset between the RD transmission start time and the time when the data frame is received. The RD offset end field indicates the offset between the RD transmission end time and the time when the data frame is received. The difference between the RD offset start field and the RD offset end field is the time granted to the responder.

Upon receiving a data frame, a responder learns the remaining TXOP duration from the Duration field in the MAC header. The receiver then checks the RD offset start and end fields to see how much time has been granted to it by the TXOP holder. If the RDG bit is set, the receiver can aggregate data packets with the BA/ACK frame. However, all transmissions need to be completed before the end of the RD offset end field.

Still referring to FIG. 3, in another embodiment, an access point (AP) may use two fields to schedule RD transmissions, including RD offset start fields 310 and/or 320 and an RD duration field. The RD offset start field indicates the start time of the RD transmission with respect to the end of the received data frame. The RD duration field indicates the time duration granted to the responder.

Multiple RD transmissions may occur in the same TXOP. In one embodiment, the queue size field in a QoS control field such as field 380 notifies the TXOP owner, i.e. the AP, regarding the buffered traffic at the STAs. Based on the queue size information received from different STAs, the AP can then schedule RD transmissions from multiple STAs.

The access point (AP) (e.g., access point 102) aggregates packets in a user's access category (AC) queue up to the aggregated Media Access Control (MAC) Protocol Data Unit (A-MPDU) aggregation limit, i.e. 64 MPDUs. The access point (AP) may aggregate and transmit only a portion of the buffered traffic for a particular user if the user's buffered traffic as a whole exceeds the criterion defined by equation (4) and there are fewer than N chosen stations (STAs) for the downlink multiple-user MIMO transmission.

Figure 4:
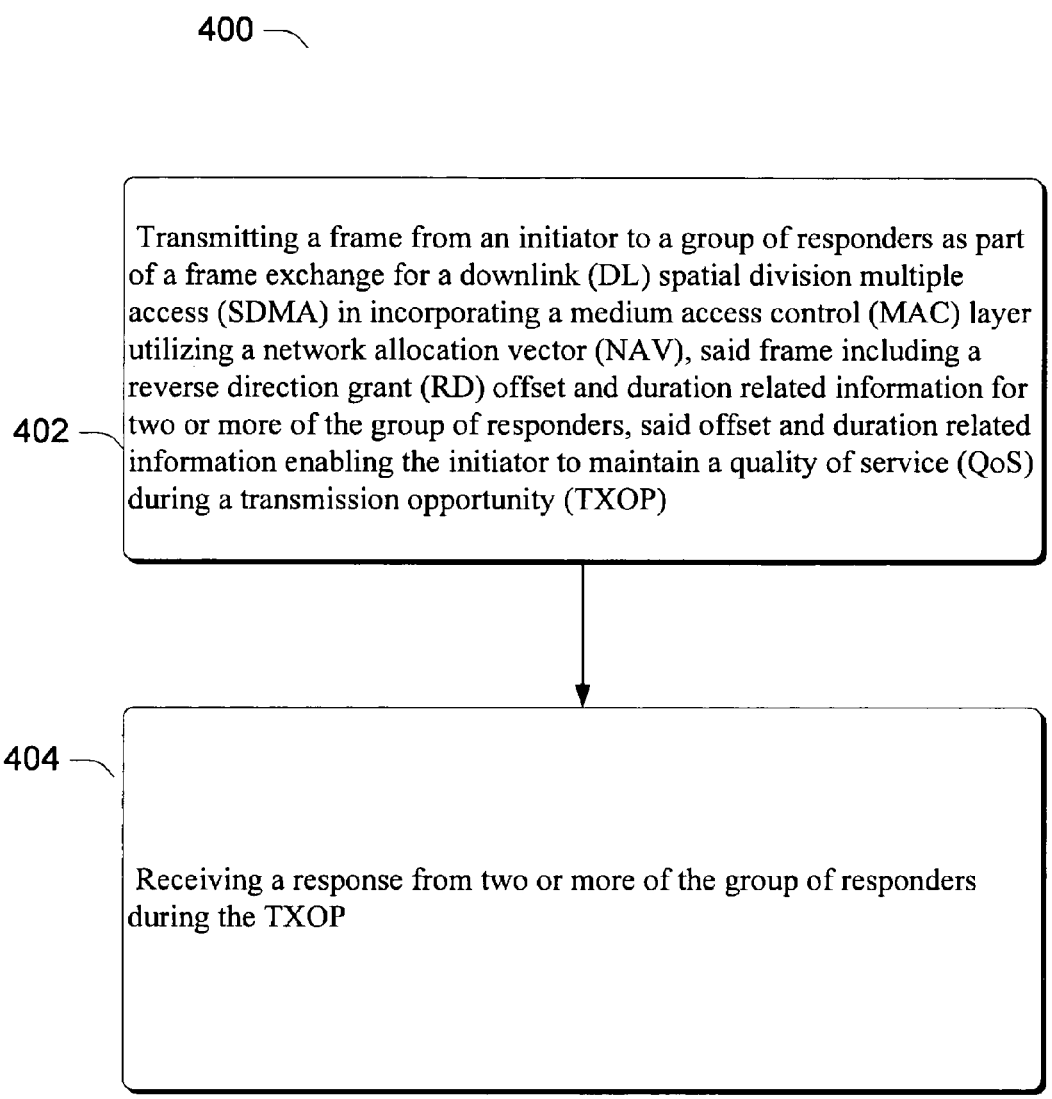
FIG. 4 is a process flow diagram illustrating a method in accordance with an embodiment.

FIG. 4 shows an illustrative flow diagram for scheduling response packets across a multiple-user MIMO network that may, but need not, be implemented using the architecture shown in FIG. 1. The process for scheduling response packets across a multiple-user MIMO network is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIG. 1. In describing the method of flowchart 400, reference is made to the access point 102 of FIG. 1. It is to be understood, however, that the method of flow diagram 400 is contemplated to be broadly applicable to a vast range of devices, and is not to be limited in its use only in connection with the exemplary embodiment of FIG. 1. Techniques and structures are described herein for supporting such a multiple responder arrangement. As used herein, the term "initiator" refers to a wireless device that initiates a wireless frame exchange and the term "responder" refers to a wireless device that responds to the wireless frame exchange.

Block 402 provides for transmitting a frame from an initiator to a group of responders as part of a frame exchange for a downlink (DL) spatial division multiple access (SDMA) in incorporating a medium access control (MAC) layer utilizing a network allocation vector (NAV), said frame including a reverse direction grant (RD) offset and duration related information for two or more of the group of responders, said offset and duration related information enabling the initiator to maintain a quality of service (QoS) during a transmission opportunity (TXOP). For example, access point 102 operable as an initiator can transmit a frame to a group of responders, STAs 112 using SDMA incorporating NAV in a MAC layer.

Block 404 provides for receiving a response from two or more of the group of responders during the TXOP. For example, during a TXOP, in accordance with an RD, two or more of STAs 112 can transmit to access point 102 a response.

Figure 5:
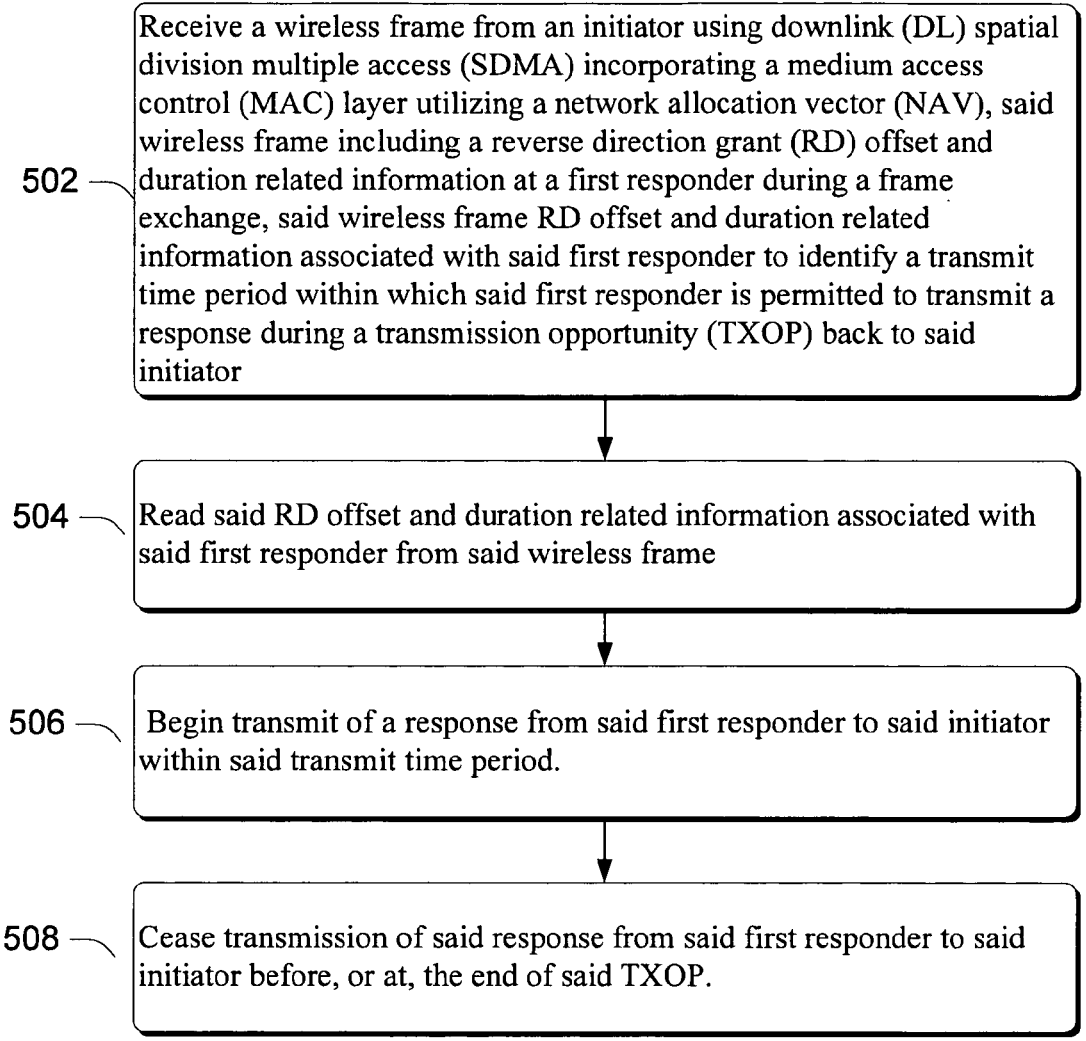
FIG. 5 is a process flow diagram illustrating a method for responding to a frame received from an initiator that scheduled response packets across a multiple-user MIMO network.

FIG. 5 shows an illustrative flow diagram for responding to a frame received from an initiator that scheduled response packets across a multiple-user MIMO network that may, but need not, be implemented using the architecture shown in FIG. 1.

Block 502 provides for receiving a wireless frame from an initiator using downlink (DL) spatial division multiple access (SDMA) incorporating a medium access control (MAC) layer utilizing a network allocation vector (NAV), said wireless frame including a reverse direction grant (RD) offset and duration related information at a first responder during a frame exchange, said wireless frame RD offset and duration related information associated with said first responder to identify a transmit time period within which said first responder is permitted to transmit a response during a transmission opportunity (TXOP) back to said initiator. For example, STA 112(1) can receive a wireless from access point 102 using SDMA and NAV.

Block 504 provides for reading said RD offset and duration related information associated with said first responder from said wireless frame. For example STA 112(1) can read the RD offset and duration related information.

Block 506 provides for begin transmit of a response from said first responder to said initiator within said transmit time period. For example STA 112(1) can transmit a response to access point 102 during a TXOP.

Block 508 provides for ceasing transmission of said response from said first responder to said initiator before, or at the end of said TXOP. For example STA 112(1) can end a transmission of a frame to access point 102 before or at the end of a TXOP.

In at least one embodiment, a STA 112 will be able to operate as both an initiator device and a responder device. The current mode of the STA 112 may depend upon whether or not the device performs the initial channel access that leads to initiation of a frame exchange sequence.

The STA 112 may be any type of device that is capable of communicating in a wireless network including, for example, a laptop, desktop, palmtop, or tablet computer having wireless networking capability, a personal digital assistant (PDA) having wireless networking capability, a cellular telephone or other handheld wireless communicator, a pager, a wireless computer peripheral, a wireless access point, and/or others. In at least one implementation, the wireless transceiver 82 and the controller 84 may be part of a wireless network interface card or other wireless network interface module.

Figure 6:
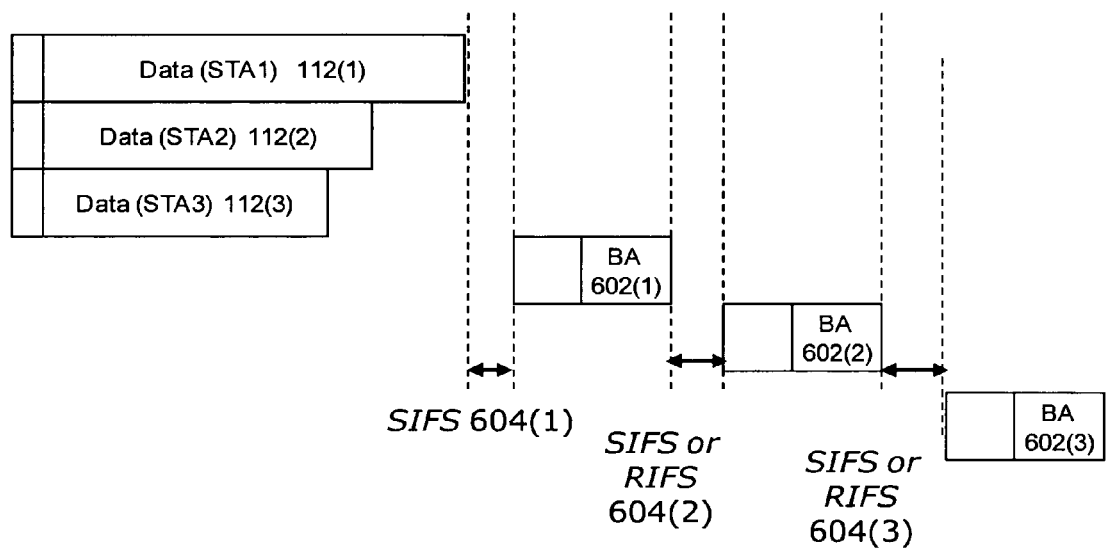
FIG. 6 is a block diagram of scheduled acknowledgements in the context of DL SDMA.

Referring now to FIG. 6, one embodiment is directed to scheduled acknowledgements in the context of DL SDMA. An access point (AP) can contend for the medium using EDCA. Once a contention is won, the AP can transmit a downlink MU-MIMO burst to multiple stations 112(1) 112(2 and 112(3). Each data packet defines an offset value such that each station knows when to transmit back a block acknowledgement (BA) 602(1), 602(2) and 602(3) after a short inter-frame spacing (SIFS) or a reduced inter-frame spacing (RIFS) shown as time segments 604(1), 604(2) and 604(3).

Figure 7:
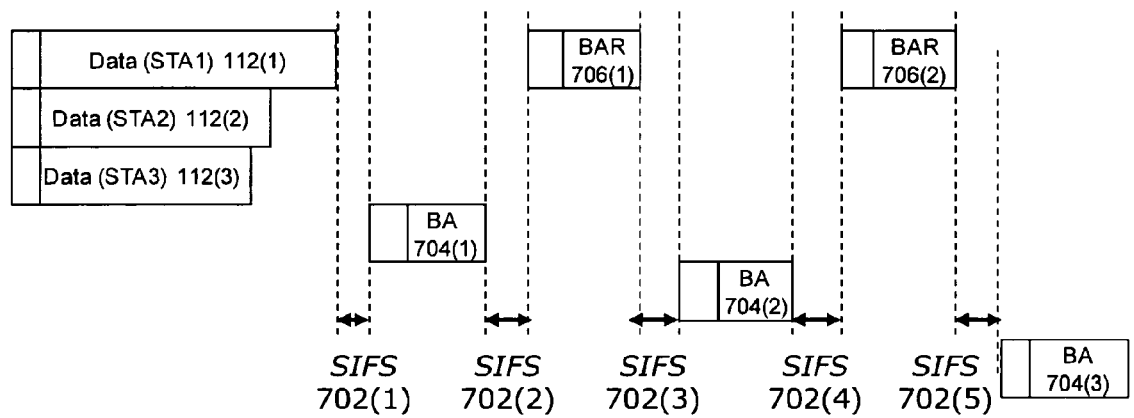
FIG. 7 is a block diagram directed to polled acknowledgements.

Referring now to FIG. 7, another embodiment is directed to polled acknowledgements. Assume an AP contends for the medium using EDCA. Once a contention is won, the AP transmits a downlink MU MIMO burst to multiple STAs 112(1), 112(2) and 112(3). Each of the stations 112 transmit a BA, shown as 704(1), 704(2), 704(3), but in a polled acknowledgement protocol, one station will transmit a BA immediately after receiving a data packet, and an AP will send out block acknowledgement request (BAR) frames, shown as BAR 706 (1) and 706(2), to poll the remaining stations for their block acknowledgements (BAs).

In some circumstances however, a station can drop an acknowledgment. According to the IEEE 802.11 MAC standard, when a station does not respond, a "Priority" Inter-Frame Space (PIFS) occurs so that the AP that has won contention for the medium can retain priority access to the medium and control for the PIFS period. If the AP senses the medium as idle PIFS after transmitting a BAR frame, according to the polled acknowledgment protocol, the AP transmits a BAR frame to poll the next station according to the DL SDMA burst transmission.

Figure 8:
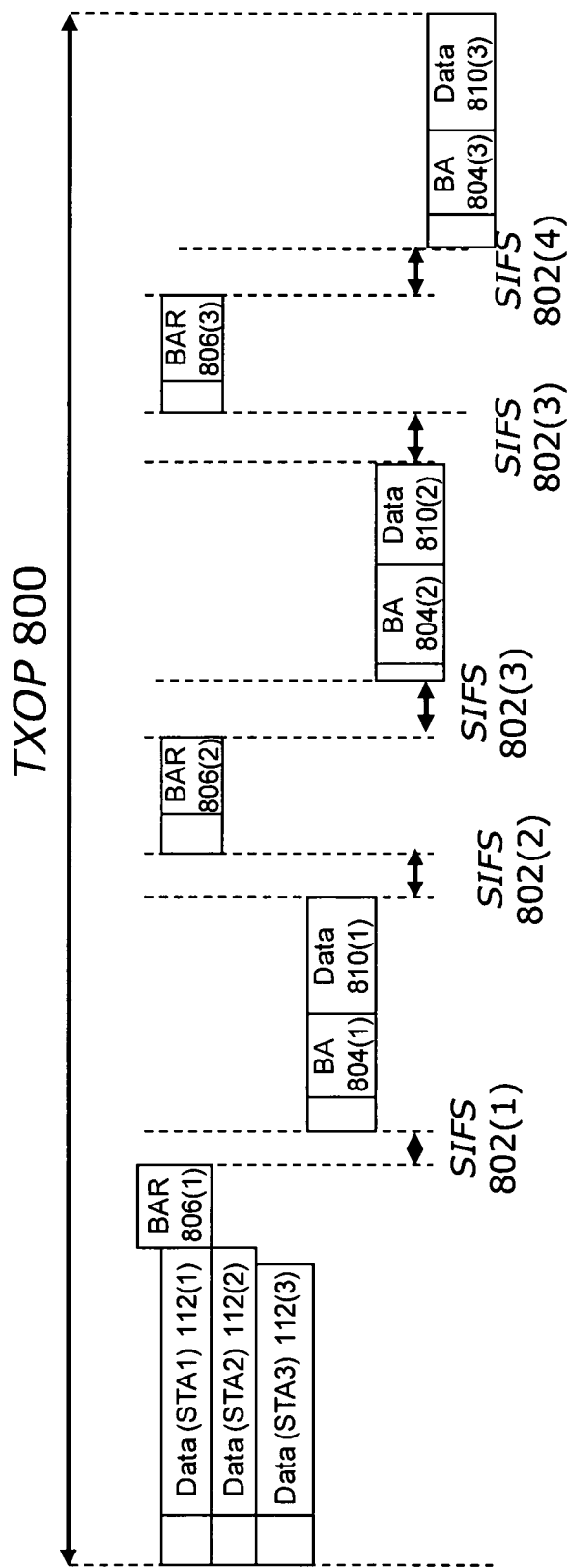
FIG. 8 is a block diagram of a polled acknowledgement protocol using reverse direction grant (RDG).
Figure 9:
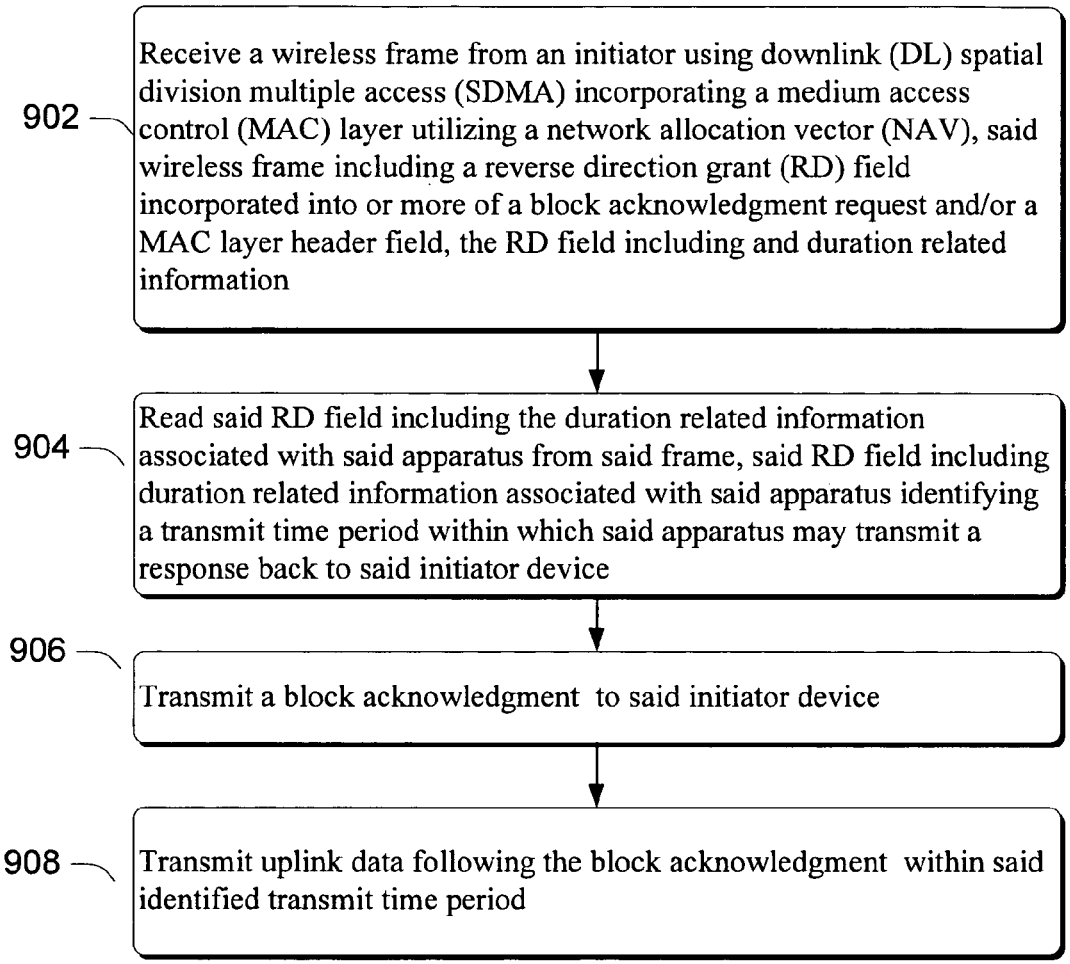
FIG. 9 is a process flow illustrating a polled acknowledgement protocol using reverse direction grant (RDG).

Referring now to FIG. 8 in combination with FIG. 9, a polled acknowledgement protocol using reverse direction grant (RDG) is illustrated in accordance with an embodiment that is meant to improve MAC efficiency by allowing stations such as stations 112(1), 112(2) and 112(3) to "piggy-back" uplink data traffic onto the block acknowledgments (BAs). FIG. 9 includes block 902 which provides for receiving a wireless frame from an initiator (e.g., AP) using downlink (DL) spatial division multiple access (SDMA) incorporating a medium access control (MAC) layer utilizing a network allocation vector (NAV), said wireless frame including a reverse direction grant (RD) field incorporated into or more of a block acknowledgment request and/or a MAC layer header field, the RD field including and duration related information. For example, as shown in FIG. 8, BAR 806(1), 806(2) and 806(3) can include an RD field. Alternatively, a data field from a MAC layer header can include the RD information.

Block 904 provides for reading the RD field including the duration related information associated with said apparatus from said frame, the RD field including duration related information associated with said apparatus identifying a transmit time period within which said apparatus may transmit a response back to said initiator device.

Block 906 provides for transmitting a block acknowledgement to said initiator device, for example stations 112(1), 112(2) and/or 112(3) transmitting a BA to an initiator AP.

Block 908 provides for transmitting uplink data following the block acknowledgment within said identified transmit time period. For example, any of stations 112(1), 112(2) and/or 112(3) can transmit a data packet "piggy backed" to a block acknowledgement sent to an initiator device.

Conclusion

In the description above, terminology is used that is related to the IEEE 802.11 wireless networking standard (and its progeny). It should be appreciated, however, that the inventive principles also have application in wireless networks and systems following other wireless standards. In addition, the embodiments discussed above describe frame exchanges that involve multiple responder devices, where offset and duration related information is provided for each of the multiple responder devices. It should be appreciated that a frame exchange sequence involving a single responder (with corresponding offset and duration related information) may also occur in at least one embodiment.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A system for scheduling response delivery across a multiple-user multiple-input-multiple-output (MIMO) network, wherein the system comprises:
    an access point (AP) in the MIMO network configured to schedule response traffic in a downlink multiple-user MIMO transmission, the AP configured to schedule one or more reverse direction grant (RD) transmissions during a transmission opportunity (TXOP) from two or more stations (STAs) using a duration determination from one or more medium access (MAC) layer header fields based on a network allocation vector (NAV) that maintains a prediction of future traffic based on the duration determination or one or more block acknowledgement request frames, wherein the two more STAs provide a queue size indicative of an amount of traffic buffered at each STA, wherein the AP uses the queue size to schedule one or more RD transmissions from the two or more STAs, and wherein an RD offset start field indicates the offset between the RD transmission start time and the time when the data frame is received by the AP, and the RD offset end field indicates the offset between the RD transmission end time and the time when a data frame is received, a determined difference between an RD offset start field and an RD offset end field providing an amount of time granted to the STA for an RD transmission.

2. The system of claim 1 wherein the AP is further configured to schedule response traffic using the duration determination includes maintaining legacy compatibility for the response traffic.

3. The system of claim 1 wherein the AP configured to schedule the one or more RD transmissions using the duration determination from the one or more MAC layer header fields, uses a quality of service (QoS) control field to determine information associated with data appropriate for the one or more RD transmissions from the one or more STAs.

4. The system of claim 1 wherein the AP configured to schedule the one or more RD transmissions using the duration determination is further configured to make the duration determination using at least a start offset field.

5. The system of claim 1 wherein the AP configured to schedule the one or more RD transmissions using the duration determination is further configured to make the duration determination using at least a start offset field and an end offset field.

6. The system of claim 1 wherein the AP is configured to schedule the one or more RD transmissions based on queue size information received from the one or more STAs via one or more quality of service (QoS) control fields.

7. The system of claim 6 wherein the queue size information enables the AP to determine how much traffic is buffered at each STA.

8. A method for use in a wireless network, comprising: transmitting a frame from an initiator to a group of responders as part of a frame exchange for a downlink (DL) spatial division multiple access (SDMA) in incorporating a medium access control (MAC) layer utilizing a network allocation vector (NAV) that maintains a prediction of future traffic based on duration information, said frame including a reverse direction grant (RD) offset and duration related information for two or more of the group of responders that provide a queue size indicative of an amount of traffic buffered at each responder, said offset and duration related information enabling the initiator to maintain a quality of service (QoS) during a transmission opportunity (TXOP), wherein the initiator uses the queue size to schedule one or more RD transmissions from the two or more responders of the group of responders, and wherein the RD offset start field indicates the offset between the RD transmission start time and the time when the data frame is received by the initiator, and the RD offset end field indicates the offset between the RD transmission end time and the time when the data frame is received, a determined difference between the RD offset start field and the RD offset end field providing an amount of time granted to the responder for an RD transmission.

9. The method of claim 8 wherein the RD offset and duration related information are provided via at least two fields in the frame exchange, the at least two fields indicative of a start and an end of an RD transmission.

10. The method of claim 8 wherein the queue size is provided via a quality of service control field.

11. The method of claim 8 wherein the RD offset and duration related information are provided via an RD offset start field and an RD offset end field, the RD offset start field and the RD offset end fields configured to identify the response offset and the time granted to the group of responders.

12. The method of claim 8 wherein: said group of responders includes a single responder.

13. The method of claim 8 further comprising: receiving a response from two or more of the group of responders during the TXOP.

14. A method for use in a wireless network, comprising: receiving a wireless frame from an initiator using downlink (DL) spatial division multiple access (SDMA) incorporating a medium access control (MAC) layer utilizing a network allocation vector (NAV) that maintains a prediction of future traffic medium based on duration information, said wireless frame including a reverse direction grant (RD) field and duration related information at a first responder during a frame exchange, said wireless frame RD field and duration related information associated with said first responder to identify a transmit time period within which said first responder is permitted to transmit a response during a transmission opportunity (TXOP) back to said initiator; reading said RD field and duration related information associated with said first responder from said wireless frame; and beginning to transmit a response from said first responder to said initiator within said transmit time period, wherein the initiator uses a queue size provided by the initiator to schedule one or more RD transmissions from the responder, and wherein an RD offset start field indicates the offset between RD transmission start time and time when the data frame is received by the initiator, and an RD offset end field indicates offset between the RD transmission end time and the time when the data frame is received, a determined difference between the RD offset start field and the RD offset end field providing an amount of time granted to the responder for an RD transmission.

15. The method of claim 14, further comprising: ceasing transmission of said response from said first responder to said initiator before, or at, the end of said TXOP.

16. An apparatus comprising: a wireless transceiver to support wireless communication with one or more remote wireless entities; and a controller to control wireless networking functions of said apparatus, wherein said controller is programmed to:
receive a frame from an initiator device during a frame exchange sequence of a downlink (DL) spatial division multiple access (SDMA) incorporating a medium access control (MAC) layer utilizing a network allocation vector (NAV) that maintains a prediction of future traffic based on duration information, said frame including a reverse direction grant (RD) offset and duration related information for two or more of the group of responders, said frame including a reverse direction grant (RD) offset and duration related information for two or more of the group of responders that provide a queue size indicative of an amount of traffic buffered at each responder wherein the initiator uses the queue size to schedule one or more RD transmissions from the two or more responders of the group of responders, and wherein the RD offset start field indicates the offset between the RD transmission start time and the time when the data frame is received by the initiator, and the RD offset end field indicates the offset between the RD transmission end time and the time when the data frame is received, a determined difference between the RD offset start field and the RD offset end field providing an amount of time granted to the responder for an RD transmission;
read offset and duration related information associated with said apparatus from said frame, said offset and duration related information identifying a transmit time period within which said apparatus and at least one of the one or more remote wireless entities may transmit a response back to said initiator device;
detect an end of said received frame; and
start transmitting a response to said initiator device within said identified transmit time period.

17. An apparatus comprising: a wireless transceiver to support wireless communication with one or more remote wireless entities; and a controller to control wireless networking functions of said apparatus, wherein said controller is programmed to:
receive a frame from an initiator device during a frame exchange sequence of a downlink (DL) spatial division multiple access (SDMA) incorporating a medium access control (MAC) layer utilizing a network allocation vector (NAV) that maintains a prediction of future traffic based on duration information, said frame including a reverse direction grant (RD) field incorporated into or more of a block acknowledgment request and/or a MAC layer header field, the RD field including duration related information, said frame including a reverse direction grant (RD) offset and duration related information for the apparatus wherein the initiator uses the queue size to schedule one or more RD transmissions from the apparatus, and wherein the RD offset start field indicates the offset between the RD transmission start time and the time when the data frame is received by the initiator, and the RD offset end field indicates the offset between the RD transmission end time and the time when the data frame is received, a determined difference between the RD offset start field and the RD offset end field providing an amount of time granted to the apparatus for an RD transmission;

read the RD field including the duration related information associated with said apparatus from said frame, said RD field including duration related information associated with said apparatus identifying a transmit time period within which said apparatus may transmit a response back to said initiator device;

transmitting a block acknowledgment to said initiator device; and transmitting uplink data following the block acknowledgment within said identified transmit time period.

18. The apparatus of claim 17, wherein: said frame received from said initiator device includes duration related information associated with multiple stations (STAs).

19. The apparatus of claim 17, wherein scheduling traffic comprises ascertaining when a particular access category (AC) wins an internal Enhanced Distributed Channel Access (EDCA) contention.

\* \* \* \* \*